UNITED STATES PATENT OFFICE.

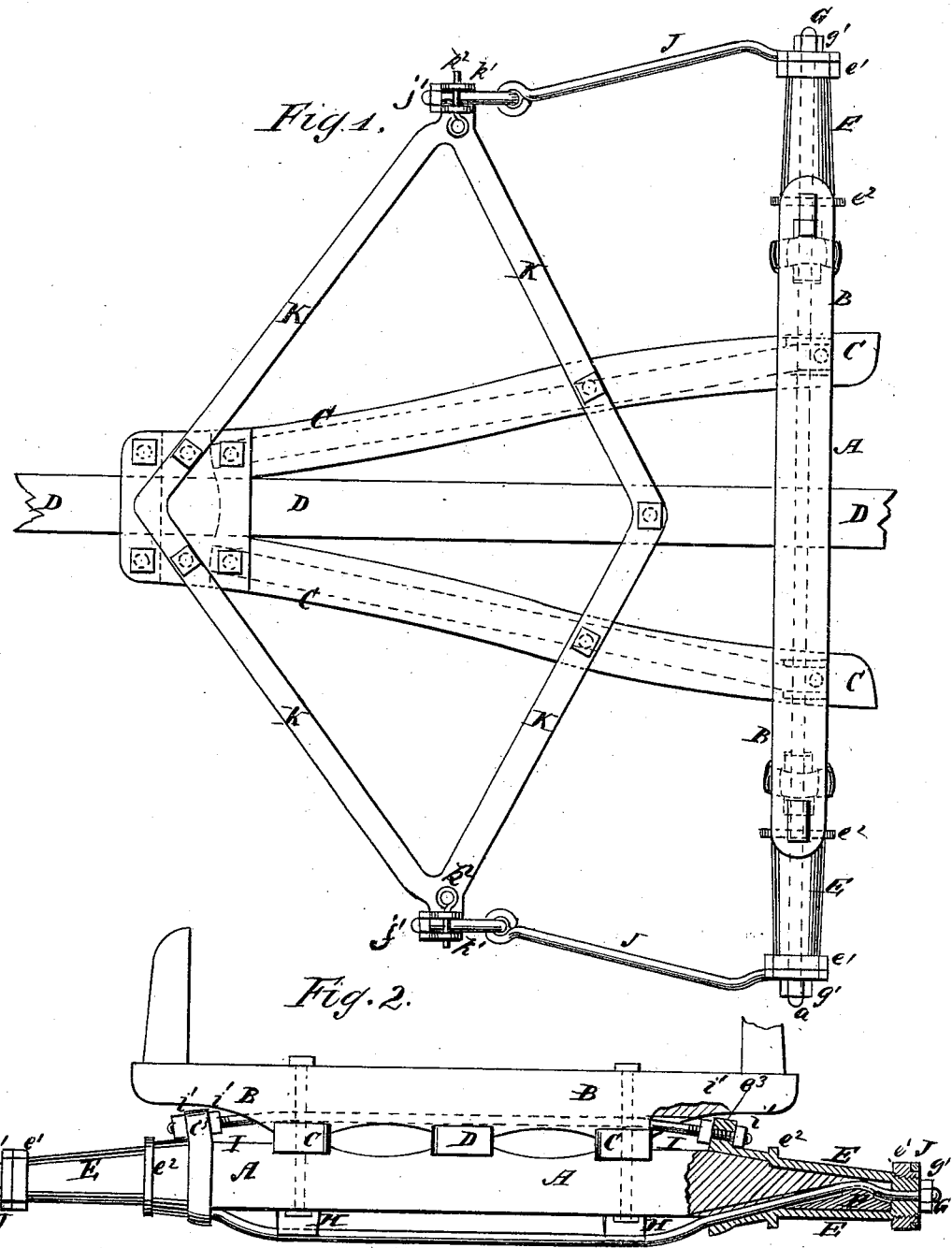

CHARLES E. COOKERLY, OF SOUTH PUEBLO, COLORADO, ASSIGNOR TO WILLIAM FARNSWORTH, OF SAME PLACE.

IMPROVEMENT IN TRUSSED WAGON-AXLES.

Specification forming part of Letters Patent No. 193,849, dated August 7, 1877; application filed June 25, 1877.

*To all whom it may concern:*

Be it known that I, CHARLES E. COOKERLY, of South Pueblo, in the county of Pueblo and State of Colorado, have invented a new and useful Improvement in Trussed Wagon-Axles, of which the following is a specification:

Figure 1 is a top view of the rear part of the running-gear of a wagon to which my improvement has been applied. Fig. 2 is a rear view of the same, partly in section, to show the construction. Fig. 3 is a detail perspective view of the skein-bridge.

Similar letters of reference indicate corresponding parts.

The object of this invention is to furnish wagons which shall be so constructed that the axles will not be liable to break when the wagons are heavily loaded and drawn over rough and uneven roads.

The invention consists in the combination of the skein-bridges and the truss-rod with the skeins and the axle; and in the combination of the jointed guard-rods and the brace-frame with the axle-nuts, the axle, and the hounds, as hereinafter fully described.

A represents the rear axle, to which the bolster B, the hounds C, and the reach D are attached, in the usual way. E is the thimble-skein, which is placed upon the spindles of the axle A, and upon which the wheel is secured by a nut, $e^1$, the inner end of the hub of the wheel resting against the shoulder or collar $e^2$, formed upon the said skein. Upon the lower side of the inner surface of the skein is placed the skein-bridge F, which may be cast solid with the said skein, or made separate, as may be desired. The upper side of the skein-bridge F is grooved longitudinally, to receive the truss-rod G, and its highest point or projection is at a point about one-third of the distance from the outer end of the skein E to the shoulder or collar $e^2$, as shown in Fig. 2. The truss-rod G passes over bridges H, upon the lower side of the axle A, enters the lower parts of the inner ends of the skeins E, passes along the upper sides of the skein-bridges F, passes out through the outer ends of the skeins E, and has nuts $g'$ screwed upon its ends.

With this construction, the rod G will form a truss from the top of the skein-bridge F to the axle-bridge H, and from the top of the skein-bridge F to the outer end of the skein E, so that the axle cannot break without drawing the rod G apart longitudinally.

I is a tension-rod, which is placed in a groove in the lower side of the bolster B, passes over and rests upon the hounds C, and its ends pass through projections $e^3$ formed upon the upper sides of the inner ends of the skeins E.

The ends of the tension-rod I have screw-threads cut upon them, to receive the nuts $i'$, which are screwed upon them—one upon each side of the projections $e^3$—so that by adjusting the said nuts $i'$ the tension of the rod I may be regulated as desired.

The tension-rods I keep the skeins E in place, strengthen the axles, and prevent them from breaking at the inner ends of the skeins E.

The nuts $e^1$ are dovetailed to receive the dovetailed ends of the rods J, which are placed upon the said nuts $e^1$ while hot, so that when cold they may grasp them firmly. The rods J are jointed near their outer ends, so that their main parts may be a little shorter than the radius of the wheels, to enable them to be turned to screw the nuts $e^1$ on and off.

The forward ends of the rods J are placed between lugs $k^1$, formed upon the upper side of the outer angles of the brace-frame K, where they are secured in place by pins $k^2$, passed through the said lugs $k^1$ above the said rods J. The forward ends of the rods J have screw-threads cut upon them to receive the nuts $j'$, so that their tension may be regulated by adjusting the said nuts $j'$. The brace-frame K is made diamond shape, and is securely bolted to the hounds C and the reach D. The rods J keep the nuts $e^1$ from working loose, prevent the axle from being broken backward by the wheels striking obstructions, and act as guards to prevent the ends of the hubs from striking against trees, stumps, and other obstructions.

Having thus described my invention, I claim as new and desire to secure by Letters Patent—

1. The combination of the skein-bridges F and the truss-rod G with the skeins E and the axle A, substantially as herein shown and described.

2. The combination of the jointed rods J and the frame K with the nuts $e^1$, the axle A, and the hounds C, substantially as herein shown and described.

CHARLES EDWARD COOKERLY.

Witnesses:
 JOHN C. LATSHAW,
 ALLEN A. BRADFORD.